W. F. WYMAN.
GRASS CRIMPING APPARATUS.
APPLICATION FILED DEC. 31, 1908.
940,630.
Patented Nov. 16, 1909.
3 SHEETS—SHEET 1.
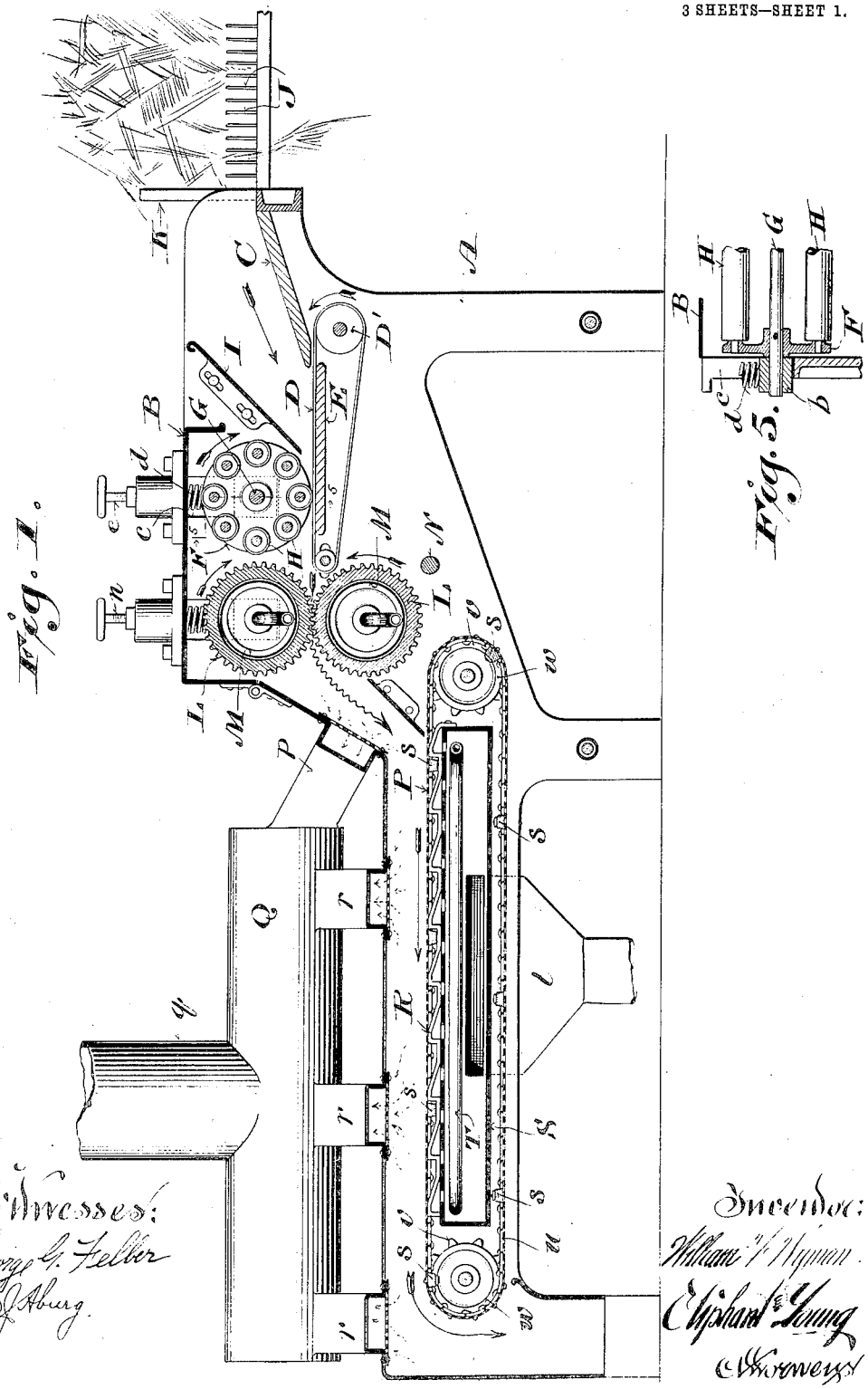

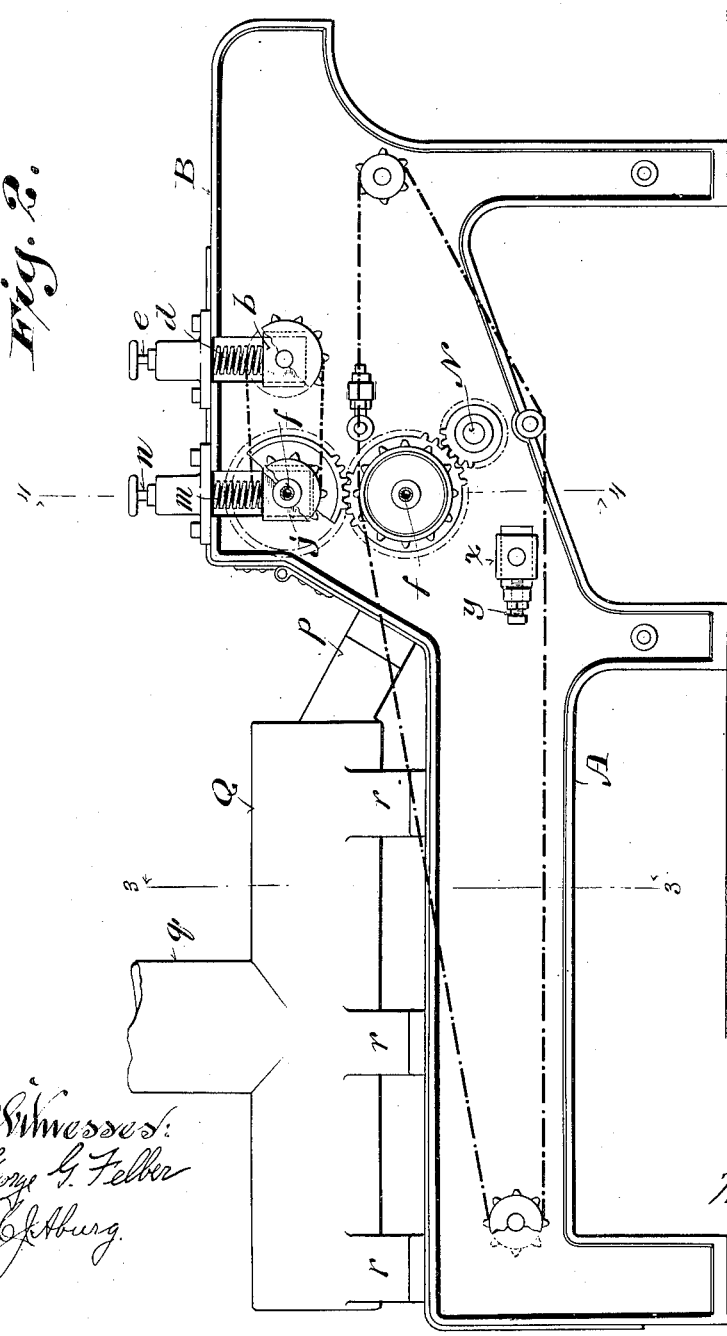

W. F. WYMAN.
GRASS CRIMPING APPARATUS.
APPLICATION FILED DEC. 31, 1908.
940,630.
Patented Nov. 16, 1909.
3 SHEETS—SHEET 3.
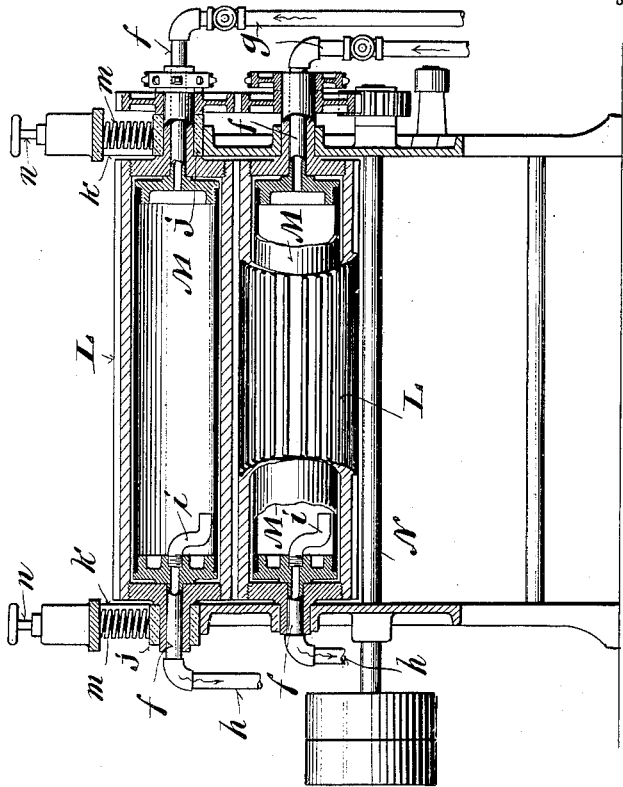
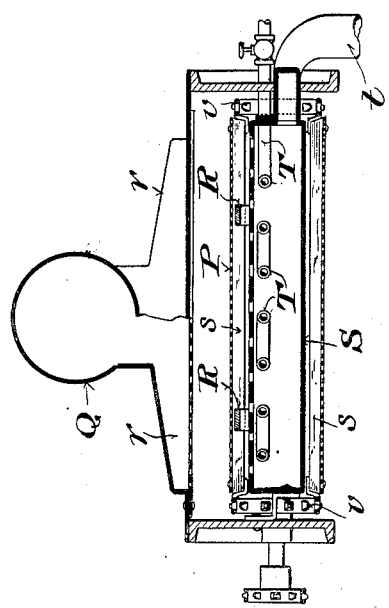

UNITED STATES PATENT OFFICE.

WILLIAM F. WYMAN, OF OSHKOSH, WISCONSIN, ASSIGNOR OF ONE-HALF TO JOSEPH A. CRUM, OF OSHKOSH, WISCONSIN.

GRASS-CRIMPING APPARATUS.

940,630.

Specification of Letters Patent. Patented Nov. 16, 1909.

Application filed December 31, 1908. Serial No. 470,230.

*To all whom it may concern:*

Be it known that I, WILLIAM F. WYMAN, a citizen of the United States, and resident of Oshkosh, in the county of Winnebago and State of Wisconsin, have invented certain new and useful Improvements in Grass-Crimping Apparatus; and I do hereby declare that the following is a full, clear, and exact description thereof.
My invention consists in what is hereinafter particularly described with reference to the accompanying drawings and pointed out in the claims of this specification, its object being to provide simple, economical and efficient apparatus for crimping and drying grasses of various kinds to form a cheap elastic non-resinous and preferably deodorized approximately fire-proof, or slow burning if ignited, packing and upholstery material designed as an economical substitute for the now expensive excelsior, said apparatus being especially designed for the conversion into a useful and profitable material of what in many places is a bountiful but waste product in the form of a coarse tough marsh grass that herbivorous animals will not eat.

Figure 1 of the drawings represents a central longitudinal vertical section view of the major portion of an apparatus in accordance with my invention for the purpose above specified; Fig. 2, a side elevation of the same; Figs. 3, 4, and 5 transverse sections of parts of the apparatus, these views being respectively indicated by lines 3—3, 4—4 and 5—5 of Fig. 1.

Referring by letter to the drawings, A indicates each of the side standards of a partly covered main frame, a top section B of the cover being in hinge-connection with the remainder of same to facilitate access to the underlying portion of the apparatus. An incline C between the standards at the front of the apparatus leads to an endless feed-apron D the upper horizontal stretch of which travels over a support E and under a feed-roller that preferably comprises a pair of annular heads F fast on a shaft G, and a series of covered rollers having rigid core-rods the ends of which serve as journals engaging said heads. The apron D and the covering of the rollers H are rubber or other suitable gripping material.

Each bearing for the shaft G is a box b for which the standard A is provided with a guide c, as best shown in Fig. 5, and a spring d opposes upward yield of the box, a hand-screw e being employed to regulate the tension of the spring.

In front of the feed-roll aforesaid is a longitudinally adjustable deflector I by which to regulate the thickness of grass material run between said feed-roll and the opposing apron, said material having been drawn through a comb J, from a receptacle K convenient to the operator at the front of the apparatus. This combing of the material serves to straighten the same before it is spread on the aforesaid incline to find its way to the feed-apron, which apron and the feed-roll maintain the parallel condition of the fibers of said material and force the same between a pair of parallel meshing longitudinal corrugated crimping-rolls L, L, each of which is loose on a stationary cylinder M and provided with hollow journals for steam-conductors $f$ in communication with the cylinder, these steam-conductors being shown as central tubular extensions of the cylinder-heads. A cock-controlled steam-supply pipe $g$ is fitted to one steam-conductor of each cylinder and an exhaust steam pipe $h$ is fitted to the other steam-conductor of the same cylinder. To facilitate the escape of water-of-condensation from each cylinder, a siphon-pipe $i$ is connected inside of said cylinder to the exhaust-steam conductor of same. By running the material between the heated meshing longitudinally corrugated roll a crimping and partial drying of the same is effected, said material being preferably, deodorized and treated to a coating of fire-proofing material preliminary to its feed to the apparatus herein specified.

The upper crimping roll is journaled in boxes $j$ for which the standards A are provided with bearings $k$, and springs $m$ resist upward yield of said rolls, hand-screws $n$ being employed to tension the springs. The lower crimping-roll is journaled in stationary bearings with which the aforesaid standards are provided.

A drive-shaft N, for which the standards A are provided with bearings, is spur-geared to a journal of the lower crimping-roll, and this journal is in turn spur-geared to a journal of the upper crimping roll, both rolls having the same speed somewhat faster than that of the pressure-roll above specified, whereby provision is had for a draw of the material fed between said crimping-rolls; and should the draw at any time be excessive, the rollers 11 of the feed-roll will slip and turn in a direction opposite that of said roll as a whole to prevent breaking of said material.

The crimped material passes down a chute from the crimping-rolls onto an endless screen-conveyer P some dust and chaff from said material being drawn off through a screened flue p of an air-drum Q having a suction-outlet q, as well as other screened flues r leading from the space in the apparatus over the conveyer. The conveyer is provided with lags s at suitable intervals apart, and a vibratory motion is imparted to said conveyer incidental to travel of its lags over cam-racks R supported on a box S having a blast-inlet t and a perforated top, a steam-coil T being arranged within said box to heat the air forced therein to escape through its top, said conveyer and the flues r into the drum Q aforesaid. The hot-air dries the crimped material carried by the conveyer P to the outlet chute U of the apparatus and dust and chaff loosened from said material by the vibratory movement of said conveyer is carried off with said air.

The lags of the conveyer are attached at their ends to link-belts u engaging sprocket-wheels v fast on suitably arranged supporting rollers w for the conveyer. Motion is transmitted from the upper crimping-roll to the feed-roll by means of sprocket-wheel and link-belt gear connecting the gear-journal of said crimping-roll with a journal of said feed-roll, and by similar means motion is transmitted from the gear-pinion of the lower crimping-roll to one of the rolls D' supporting the feed-apron as well as to one of the rollers w supporting the conveyer, said gear being clearly shown in Fig. 2.

One of the apron-rollers and one of the conveyer-rollers may be journaled in adjustable boxes to provide for taking up slack, such a box x and an adjusting screw y for same being shown in Fig. 2.

Various changes of detail may be made in the construction of the apparatus without departure from the scope of my invention as herein claimed.

I claim:

1. A grass-crimping apparatus comprising a feed-mechanism, means by which to straighten material on its way to said mechanism and to preserve the parallel condition of the fibers of the fed material, a pair of crimping rolls, an endless traveling vibratory screen-conveyer upon which material is discharged from said rolls, and means whereby a current of hot-air is forced through the conveyer and material thereon.

2. A grass-crimping apparatus comprising a feed-mechanism, means by which to straighten material on its way to said mechanism and to preserve the parallel condition of the fibers of the fed material, a pair of crimping-rolls, an endless traveling screen conveyer upon which material is discharged from said rolls, a hot-air distributer box within the confines of the conveyer, and cam-racks on the box opposed to lags of said conveyer.

3. A grass-crimping apparatus comprising a feed-mechanism, means by which to straighten material on its way to said mechanism and to preserve the parallel condition of the fed material, a pair of crimping-rolls and means for heating same, an endless vibratory traveling conveyer upon which material is discharged from the rolls, and means for hot-air drying of the crimped material on the conveyer and for expulsion of dust and chaff loosened from said material.

In testimony that I claim the foregoing I have hereunto set my hand at Oshkosh, in the county of Winnebago and State of Wisconsin in the presence of two witnesses.

WILLIAM F. WYMAN.

Witnesses:
  CHAS. OELLERICH,
  OLIVE E. ARNOLD.